US008230409B2

(12) United States Patent
Grcevski et al.

(10) Patent No.: US 8,230,409 B2
(45) Date of Patent: Jul. 24, 2012

(54) CODE OPTIMIZATION WHEN USING MULTIPLE READER LOCKS AND A NON-READER LOCK

(75) Inventors: Nikola Grcevski, Toronto (CA); Mark Graham Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 11/864,401

(22) Filed: Sep. 28, 2007

(65) Prior Publication Data

US 2009/0089769 A1 Apr. 2, 2009

(51) Int. Cl.
*G06F 9/45* (2006.01)
(52) U.S. Cl. ........................................ 717/151; 717/153
(58) Field of Classification Search .................. 717/151, 717/153
See application file for complete search history.

(56) References Cited

U.S. PATENT DOCUMENTS

| | | | | |
|---|---|---|---|---|
| 5,237,694 | A * | 8/1993 | Horne et al. | 710/200 |
| 6,029,190 | A * | 2/2000 | Oliver | 718/107 |
| 6,304,924 | B1 * | 10/2001 | Varma | 710/52 |
| 6,823,511 | B1 | 11/2004 | McKenney et al. | |
| 6,910,212 | B2 | 6/2005 | Brenner et al. | |
| 6,915,522 | B2 * | 7/2005 | Arajs et al. | 718/104 |
| 7,908,255 | B2 * | 3/2011 | Detlefs et al. | 707/703 |
| 2002/0078284 | A1 | 6/2002 | McKenney | |
| 2005/0149634 | A1 | 7/2005 | McKenney | |
| 2006/0168585 | A1 * | 7/2006 | Grcevski et al. | 718/104 |
| 2006/0200609 | A1 | 9/2006 | Kolinummi et al. | |

FOREIGN PATENT DOCUMENTS

WO 0152083 7/2001

OTHER PUBLICATIONS

Bruening, et al. "Thread-Shared Software Code Caches", 2006, IEEE, p. 1-11.*

* cited by examiner

*Primary Examiner* — Wei Zhen
*Assistant Examiner* — Qamrun Nahar
(74) *Attorney, Agent, or Firm* — Yee & Associates, P.C.; David A. Mims, Jr.

(57) ABSTRACT

A way to use multiple-reader locks for those paths where no writes occur is provided. Only if one of the writing paths executes will a full writer lock be acquired. Two copies of the critical section comprising a reading version and a writing version are created. The default execution leads to the reader version, which only acquires a reader-lock. The reader version of the code executes prior to execution of the writer lock only version, otherwise bypassing the writer lock only version. If the execution leads to a path in which a write would occur, the reader only version branches to the beginning of the writer version. The writer version is identical to the original code and obtains a full writer lock. If execution in the reader lock does not lead to a path that writes, then only the reader lock is acquired.

12 Claims, 3 Drawing Sheets

CODE OPTIMIZATION WHEN USING MULTIPLE READER LOCKS AND A NON-READER LOCK

BACKGROUND OF THE INVENTION

1. Field of the Invention

The present invention relates generally to computer usable program code optimization and more particularly to a computer implemented method, a data processing system and a computer program product for optimizing computer usable program code containing multiple reader locks having at least one non-reader lock therein.

2. Description of the Related Art

Multiple reader locks are used to improve the performance of synchronized, multi-threaded programs by allowing many threads to enter critical sections if only variable reads will be performed. Once a thread obtains a lock to do a write, all other threads that might access the critical section must wait for the single writer to finish before being able to proceed. To transform a particular critical section to use a multiple-reader lock, the programmer or compiler must verify that no variable writes occur inside. If any writes occur, then a writer lock must be used which will slow down all other threads. This requirement is needed even if the critical section only writes to variables on some paths of execution, but not on others, even if those paths where the writes occur are only rarely executed. Since write locks force all threads to wait until the writer access is complete, performance can suffer markedly, even if the thread making the write access does not actually write to any variable.

SUMMARY OF THE INVENTION

Illustrative embodiments provide a computer implemented method, a data processing system and a computer program product for optimization of a computer usable program code segment containing multiple reader locks having a non-reader lock therein. The computer implemented method comprising identifying a critical segment within the computer usable program code segment, replicating the critical segment to create a replicated segment, and establishing a reader lock only version of the critical segment and a writer lock only version of the replicated segment.

The data processing system comprising a bus, a storage device connected to the bus, wherein the storage device contains computer usable code, a communications unit connected to the bus, and a processing unit connected to the bus wherein the processing unit executes the computer usable program code to direct the data processing system to identify a critical segment within the computer usable program code segment, replicate the critical segment to create a replicated segment, and establish a reader lock only version of the critical segment and a writer lock only version of the replicated segment.

The computer program product comprising computer usable program code tangibly embodied on a computer usable recordable type medium, the computer usable program code comprising computer usable program code for identifying a critical segment within the computer usable program code segment, computer usable program code for replicating the critical segment to create a replicated segment, and computer usable program code for establishing a reader lock only version of the critical segment and a writer lock only version of the replicated segment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
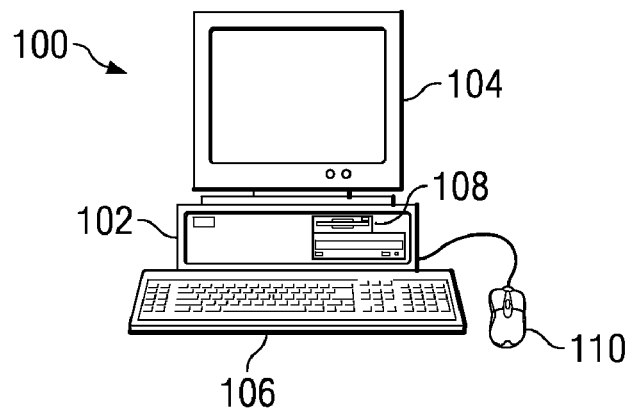
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computers, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
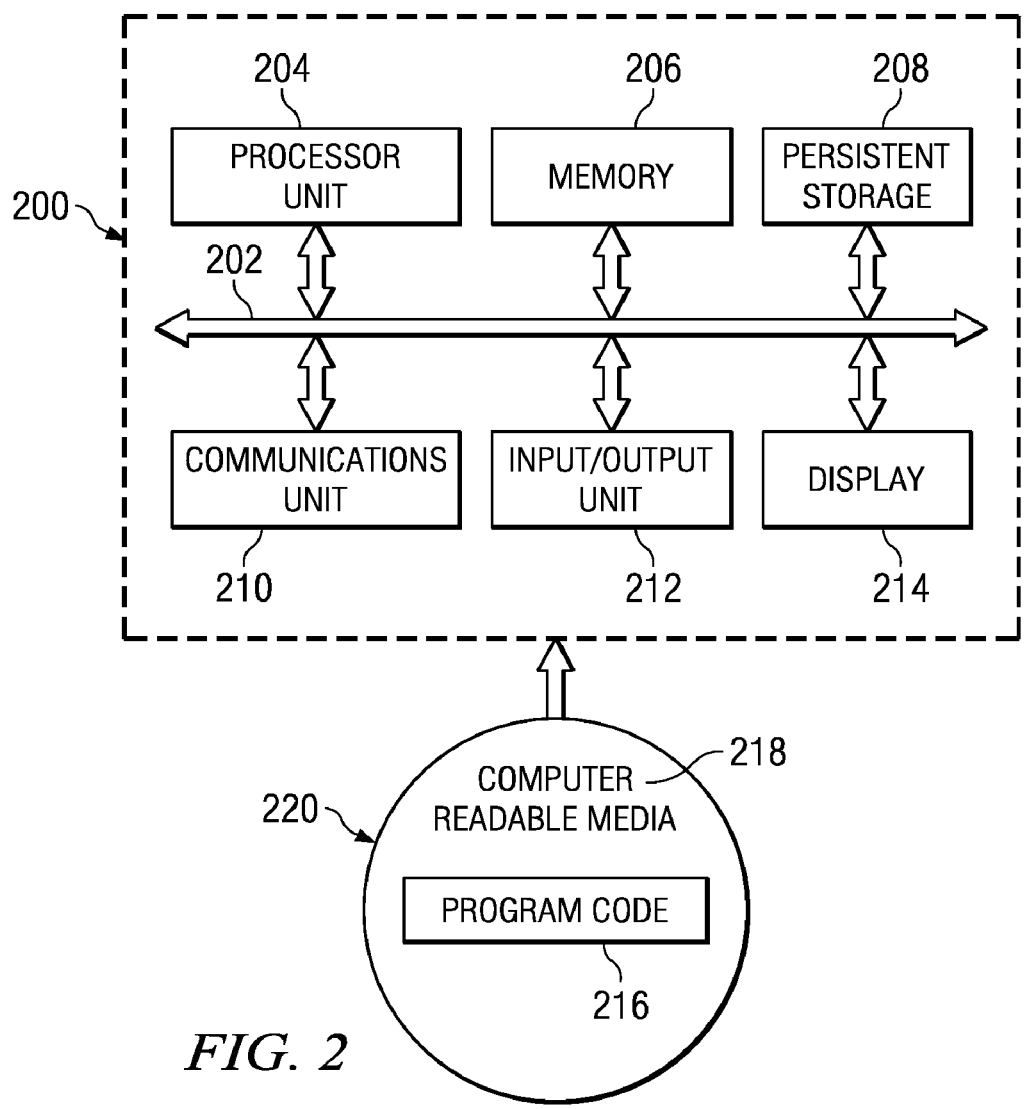
FIG. 2 is a block diagram of a computer, such as computer 100 in FIG. 1, in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 206 or a cache. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Figure 3:
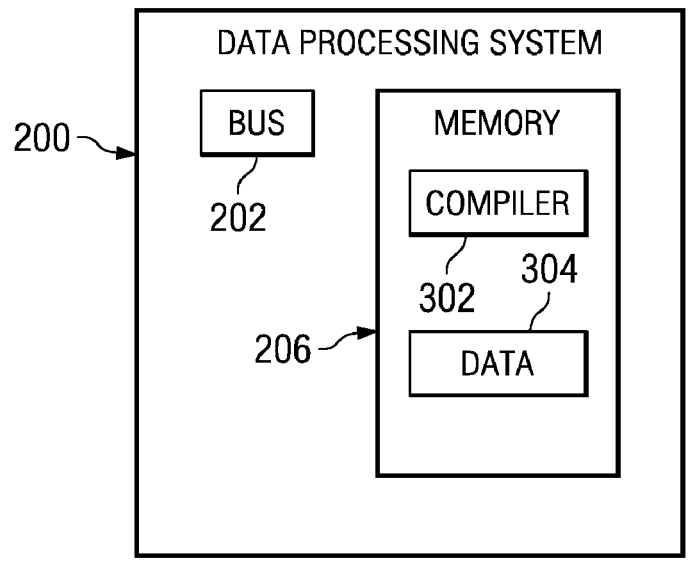
FIG. 3 is block diagram of a subset of components of computer 200 of FIG. 2, in which illustrative embodiments may be implemented.

With reference to FIG. 3 a block diagram of a subset of components of computer 200, particularly memory 206, computer readable media 218 and program code 216 of FIG. 2, is shown in which illustrative embodiments may be implemented. Memory 206 includes compiler 302 for compilation of program code 216 obtained from persistent storage 208 or computer readable media 218. Compiler 302 may also obtain and process information within data 304 also located in memory 206. Compiler 302 provides code scanning and other functions related to compilation of program code 216. Further, compiler 302 may provide optimization services to selectively improve the operational efficiency of program code 216. Various techniques of compiler optimization may be used on program code 216 to improve the run-time behavior of the compiled output. These techniques may be selectively applied based on the directives chosen during execution of compiler 302 in combination with program code 216. For example, the compiler may be requested to examine and insert code, through code expansion, from a code library.

Program code may be in a source form or an object form, previously compiled and ready to execute. In a source form, program code 216 may be input to compiler 302 for compiling into a program code executable that may then be used to direct data processing system 200 to perform useful tasks. A collection of one or more instances of compiled code forms an application. As more users of the application use the services of the application there is more demand placed on efficient operation of the application. The application will process data, such as data 304, in memory 206. Typically there may be times when multiple users of the application request to process the same data 304. If in such cases there are many read requests, the application may handle the requests in a timely manner. However, when there is a mix of read and write requests to data 304, users will perceive a slow down in performance because each write request causes those having a read request to wait for the duration of the write to the shared data of data 304 to complete. To reduce wait time, program code 216 may be selectively optimized to maximize the user of multiple reader locks where desirable and possible.

Multiple reader locks allow several threads of the application to simultaneously acquire a lock when only read accesses will be performed, but only one thread may acquire that same lock if a write access is to be performed. By reducing contention for the lock when most threads only perform read accesses, program throughput can be significantly enhanced. A modification to the multiple reader lock technique is introduced that addresses a limitation, in which a particular locked region of code may not employ a multiple reader lock if a write may occur while the lock is held. A code transformation is provided that enables the more efficient multiple reader lock to be used whenever control flow paths execute where no writes occur. Only if the program begins to execute a path that will cause a write to occur will a full writer lock be acquired. Once control enters such a path, the entire critical section will be re-executed under a full writer lock to ensure correctness; any values read while the critical section was protected only under the reader lock are thrown away.

Figure 4:
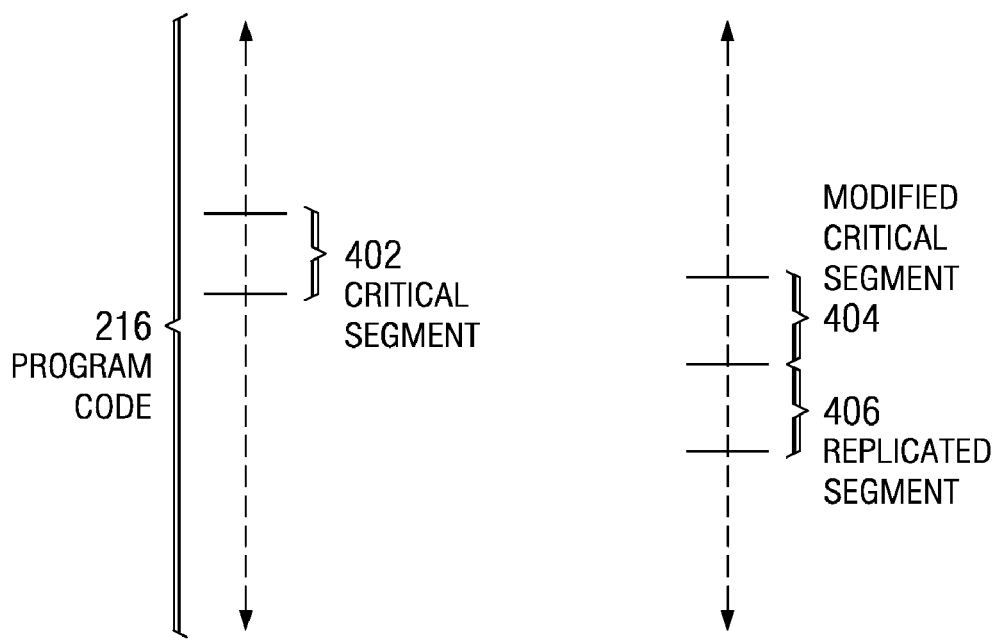
FIG. 4 is a schematic diagram of program code segmentation and modification in accordance with illustrative embodiments.

Referring to FIG. 4, a schematic diagram of program code segmentation in accordance with illustrative embodiments is shown. A representative fragment of program code 216 is shown in a before and after status. In the before status, program code 216 of FIG. 2 comprises a sequence of computer executable instructions including a critical segment 402. Critical segment 402 is a sequence of instructions that includes more than one read path and at least a non-read path. Normal execution of critical segment 402 may lead to unnecessary write lock operations.

The portion of program code 216 containing critical segment 402 is a candidate for selective compiler optimization. After performing the optimization, two segments are shown in the "after" version of program code 216. One segment is modified critical segment 404, while the other is replicated segment 406. Modified critical segment 404 contains only a reader lock version of previous critical segment 402. Replicated segment 406 is an image of critical segment 402 with a modification. The modification produces a write lock only version of the code that also releases the previous reader lock as a first operation. Illustrative embodiments locate critical segment 402 wherein identifying a critical segment comprises scanning the computer usable program code 216 to locate computer usable program code having a set of reader lock only execution paths that only reads variables and a set of second execution paths wherein a second execution path is one of a write to a variable requiring a write lock only, a function call that is unsafe, and a path that cannot be analyzed. The function call may be to a subroutine that is not available for examination or the path may be too complex to analyze and fit within the previously described transform framework.

Figure 5:
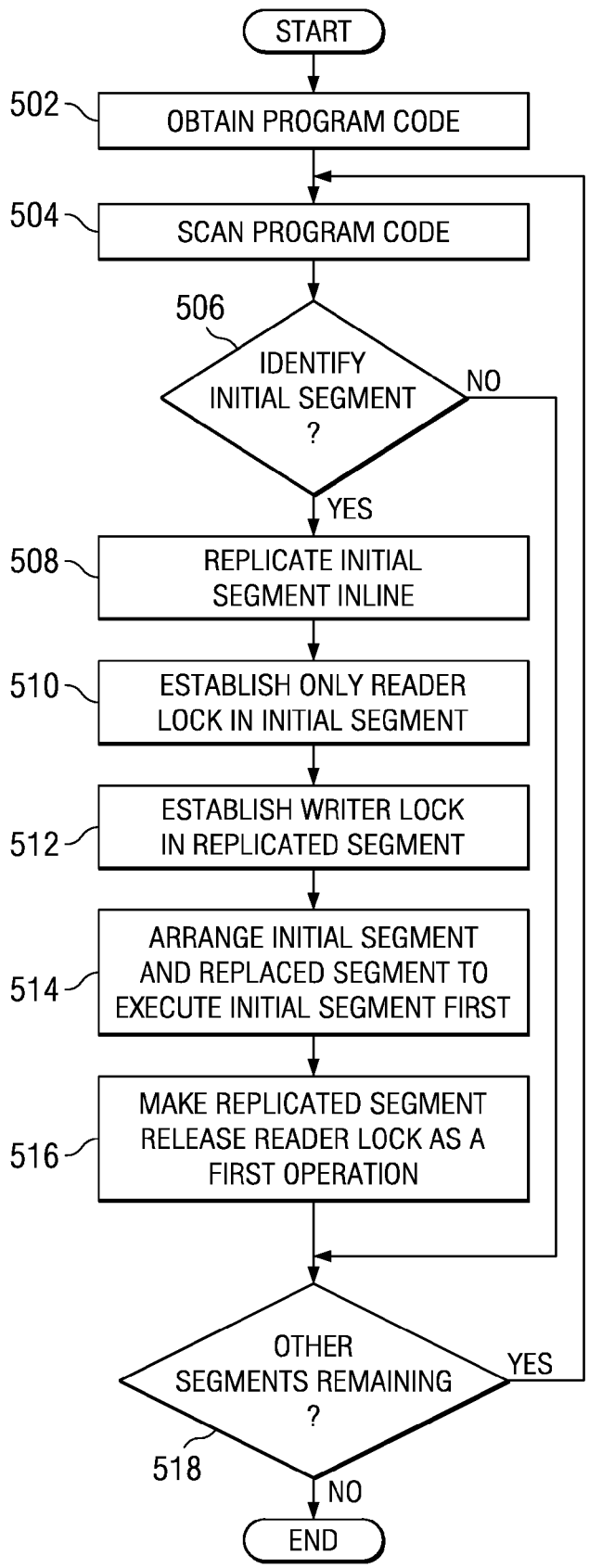
FIG. 5 is flowchart of the process of program code segmentation and modification of FIG. 4 in accordance with illustrative embodiments.

With reference to FIG. 5, a flowchart of the process of the program code segmentation and modification of FIG. 4 is provided. The optimization process 500 of compiler 302 of FIG. 3, starts with obtaining program code 216 of FIG. 2, which is to be compiled (step 502). The scanning component of compiler 302 scans the supplied code to determine candidate code segments for optimization (step 504). In this case, the optimization desired deals with producing a more efficient use of multiple reader locks having at least one non-read path within.

A critical segment has been identified, resulting in a "yes" in step 506 or has not been identified in which case a "no" results in step 506. If "no" is determined in step 506, then process 500 skips to step 518. If "yes" is determined in step 506, then replicate the identified critical segment inline within program code 216 (step 508).

The identified critical segment is then processed through modifications to establish use of only a reader lock, thereby creating a reader version of the critical segment 402 (step 510). The replicated segment is then processed to establish use of only a writer lock, thereby creating a writer version of critical segment 402 (step 512).

The sequence of the critical segment and the replicated segment is then checked. If necessary, the segments are arranged to have the segment comprising the reader version occur first, prior to the writer version, to ensure proper execution of the code path (step 514). Establishing the reader version as the first segment ensures the reader version will be executed prior to the writer version, as was the normal case before code modification occurred.

Further processing of the writer version alters the code to include a release of the previous read lock as the first operation to be performed in the code segment before attempting to acquire the write lock (step 516). The release of the previous reader lock ensures no data is carried over from a previous execution of a segment of code.

The code is then scanned for additional segments to process (step 518). If "no" in step 518, then process 500 ends. If "yes" in step 518, process 500 reverts to step 504 to continue scanning and processing of the code segments.

Illustrative embodiments may be applied to a high-level language program by a programmer or may be applied automatically by a compiler or any other program transformation tool. Support is expected for a multiple-reader lock implementation, as well as a mechanism for performing an unconditional branch in the source language of the program code. The unconditional branch restriction can be avoided by replicating code as in the illustrative embodiment provided. Illustrative embodiments provide use of multiple-reader locks for paths while no writes occur. When one of the writing paths executes, a full writer lock will be acquired. Enabling a form of path control in a more effective manner, therefore, typically yields higher program performance since more threads are able to enter critical sections without waiting as often for writer locks.

By way of example, the following code samples and associated description are provided. In a first example, there is a critical section of code which initially acquires a traditional lock where only one thread is allowed to execute the critical section at a time and writes to a variable only if o.f1==o.f2.

```
AcquireLock(o);
t1 = o.f1;
t2 = o.f2;
if (t1 == t2) {
    o.f3++;
}
ReleaseLock(o);
```

If the values of o.f1 and o.f2 are unlikely to be the same, then this critical section most often reads the values of the two fields and multiple threads could safely execute the code at the same time. When the values are the same, the critical section writes to the o.f3 field and a multiple-reader lock cannot be used, because it may generate incorrect program state.

A transformation of the critical section is performed to create two copies of the critical section. A reader version, indicated in normal typeface and a writer version, indicated in bold typeface. The transformed multiple-reader version of the code uses a compensating writer code section.

```
AcquireReaderLock(o);
t1 = o.f1;
t2 = o.f2;
if (t1 == t2) {
    ReleaseReaderLock(o);
    Goto writer;
}
ReleaseReaderLock(o);
goto cont;
writer:
AcquireLock(o);
t1 = o..f1;
t2 = o..f2;
if (t1 == t2) {
    o..f3++;
}
ReleaseLock(o);
cont:
```

In the reader version of the code, once execution leads to a path that will write to a variable, the reader lock is released and there is an unconditional branch to the writer version. The writer version acquires a full lock and then performs all the steps of the original critical section, thereby ensuring no information is passed from the reader version to the writer version so that the atomicity of the critical section is preserved. In this example, the unconditional branch is unnecessary and the writer version of the critical section could be completely contained inside the if-statement.

```
AcquireReaderLock(o);
t1 = o.f1;
t2 = o.f2;
if (t1 == t2) {
    ReleaseReaderLock(o);
    AcquireLock(o);
    t1 = o.f1;
    t2 = o.f2;
    if (t1 == t2) {
        o.f3++;
    }
    ReleaseLock(o);
}
else {
    ReleaseReaderLock(o);
}
```

In another example, an alternative transformation conceptually implements the critical section as a loop in which the loop will execute either once or twice, depending on whether a writing path is executed during the first iteration. A boolean flag, called writerLock in the example, is used to determine, after the loop is exited, whether a reader lock or a regular lock must be released.

```
AcquireReaderLock(o);
writerLock = false; // extra operation on reader path
enterCriticalSection:
t1 = o.f1;
t2 = o.f2;
if (t1 == t2) {
    if (!writerLock) {
        ReleaseReaderLock(o);
        AcquireLock(o);
        writerLock = true;
        goto enterCriticalSection;
    }
    else
        o.f3++;
}
if (!writerLock) // extra operation on reader path
    ReleaseReaderLock(o);
else
    ReleaseLock(o);
```

This alternative transformation has reduced code size at the expense of extra operations executed on the presumably more common reader paths. Typically, full replication is desirable to avoid adding operations to the reader paths, but it should be obvious to one skilled in the art how this alternative transformation could just as easily be employed to save code size.

In another more complex example, variable writes are not the only program feature that might prevent transforming locks into multiple-reader locks. In a compiler that automatically transforms critical sections to use a multiple-reader lock, there may be a method or function invocation on some execution path that either cannot be analyzed, for example, a library call, or that is impractical to analyze because of the size of the call-graph rooted at that invocation.

On paths that contain such features, where it may not be allowed or impractical to use a multiple reader lock, a writer lock may be held, while a reader lock can be used for all other thread safe paths. In the following example, a more complicated critical section is illustrated where a reader lock can be used for some of the execution paths, but not on others. The critical section as written originally by a programmer is provided.

```
boolean t=false, t2=false;
AcquireLock(o);
if (o.f1 == false) {
    if (o.f2 == false) {
        if (o.f3 == false) {
            HandleThisCase(o);
        }
        else {
            o.f4 = true;
        }
    }
    else {
        if (o.f3 == false) {
            t = true;
        }
        else {
            t = o.f4;
        }
    }
}
else {
    if (o.f2 == false) {
```

```
            if (o.f3 == false) {
                o.f4 = true;
            }
            else {
                HandleThisCase(o);
            }
        }
    }
    else {
        if (o.f3 == false) {
            t2 = true;
        }
        else {
            t2 = o.f5;
        }
    }
}
ReleaseLock(o);
// use t, t2 to do something else
```

There are eight execution paths through this critical section, yet there are two paths that call a function (HandleThisCase) which may be unavailable or too complicated to analyze. Also, in the example above there are two paths where the o.f3 or o.f4 fields are written. Traditionally, a multiple-reader lock could not be used, even for the remaining four paths where field values are only read (the variables t and t2 are local variables for each thread and so writes to these variables do not prevent using a multiplereader lock).

This code can be transformed as shown using normal typeface for the reader version and bold typeface to show the writer version of the critical section.

```
boolean t=false, t2=false;
AcquireReaderLock(o);
if (o.f1 == false) {
    if (o.f2 == false) {
        ReleaseReaderLock(o);
        goto getWriterLock;
    }
    else {
        if (o.f3 == false) {
            t = true;
        }
        else {
            t = o.f4;
        }
    }
}
else {
    if (o.f2 == false) {
        ReleaseReaderLock(o);
        goto getWriterLock;
    }
    else {
        if (o.f3 == false) {
            t2 = true;
        }
        else {
            t2 = o.f5;
        }
    }
}
ReleaseLock(o);
goto Cont;
getWriterLock:
AcquireLock(o);
if (o.f1 == false) {
    if (o.f2 == false) {
        if (o.f3 == false) {
            HandleThisCase(o);
        }
        else {
            o.f4 = true;
```

```
        }
    }
    else {
        if (o.f3 == false) {
            t = true;
        }
        else {
            t = o.f4;
        }
    }
}
else {
    if (o.f2 == false) {
        if (o.f3 == false) {
            o.f4 = true;
        }
        else {
            HandleThisCase(o);
        }
    }
    else {
        if (o.f3 == false) {
            t2 = true;
        }
        else {
            t2 = o.f5;
        }
    }
}
ReleaseLock(o);
Cont:
// use t, t2 to do something else
```

The unconditional branches to the writer version of the code are inserted as early as possible. If o.f1 and o.f2 are both false, then all execution paths from that point, regardless of the value of o.f3, will require a writer lock. The value of o.f3 does not need to be tested at that point, as it will be tested inside the writer lock when it is acquired. At the cost of replicating the writer version of the critical section, the unconditional branches in the reader version would not be required, although the replication would further increase the size of the code.

The proposed transformation of locks into multiple-reader locks, when write paths exist, is especially valuable when there is code execution frequency profiling information available to the compiler indicating that the reader paths are more frequently executed. In such a case, the compiler can decide whether the transformation will be beneficial, based on the number of times the reader paths were taken compared to the number of times writer paths were taken. If the reader versus writer ratio is below a predetermined threshold, then the transformation might introduce additional overhead because the transformation locks and unlocks twice when a writer path is executed.

Further, the transformation cannot simply unlock the reader lock and acquire a writer lock in the write path. It is possible for two critical sections, executed by different threads, to communicate values such that the wrong values would be computed. Consider the following example with two different critical sections.

| CS1: | CS2: |
|---|---|
| AcquireLock(o); | AcquireLock(o) |
| if (o.x) { | if (o.y) { |
|    o.y = false; |    o.x = false; |
|    t = false; |    t = false; |
| } | } |

| CS1: | CS2: |
|---|---|
| else<br>    t = o.y;<br>    ReleaseLock(o);<br>// use t | else<br>    t = o.y<br>    ReleaseLock(o);<br>// use t |

These critical sections, when executed by different threads at the same time, would normally execute in sequence with no overlap. Either CS1 would execute followed by CS2, or CS2 would execute followed by CS1. In either case, a value is communicated if the o.x and o.y fields are initially true. If CS1 executes first, then o.y will be set to false and o.x will remain true. If CS2 executes first, then o.x will be set to false and o.y will remain true. So, from the initial conditions that both fields are set to true, after executing these two code sections only one of the fields will be set to false.

If the code sections are transformed using multiple-reader locks in such a way that a writer lock is acquired and if the code protected by the if-statement executes, then the transformed code would become:

| CS1: | CS2: |
|---|---|
| AcquireReaderLock(o);<br>if (o.x) {<br>    ReleaseReaderLock(o);<br>    AcquireLock(o);<br>    o.y = false;<br>    t = false;<br>    ReleaseLock(o);<br>}<br>else {<br>    t = o.y;<br>    ReleaseReaderLock(o);<br>}<br>// use t | AcquireReaderLock(o);<br>if (o.y) {<br>    ReleaseReaderLock(o);<br>    AcquireLock(o);<br>    o.x = false;<br>    t = false;<br>    ReleaseLock(o);<br>}<br>else {<br>    t = o.x;<br>    ReleaseReaderLock(o);<br>}<br>// use t |

If the two fields, o.x and o.y, are initially set to true after executing the transformed code it is possible that both fields are set to false. Two threads might both acquire a reader lock at the same time. One thread might read the value of o.x at the same time that the second thread reads o.y. Both values are true. Then both threads will release their reader locks and try to acquire a writer lock. According to the writer lock semantics, the two threads will access the fields in a sequential manner, in which case both will set the fields o.x and o.y to false. An incorrect program state has resulted because the atomicity of the lock was not maintained. Using the previous described transform methodology correctly transforms the critical sections.

| CS1: | CS2: |
|---|---|
| AcquireReaderLock(o);<br>if (o.x) {<br>    ReleaseReaderLock(o);<br>    AcquireLock(o);<br>    if (o.x)<br>        o.y = false;<br>    t = false;<br>    ReleaseLock(o);<br>}<br>else {<br>    t = o.y;<br>    ReleaseReaderLock(o); | AcquireReaderLock(o);<br>if (o.x) {<br>    ReleaseReaderLock(o);<br>    AcquireLock(o);<br>    if (o.y)<br>        o.x = false;<br>    t = false;<br>    ReleaseLock(o);<br>}<br>else {<br>    t = o.x;<br>    ReleaseReaderLock(o); |
| }<br>// use t | }<br>// use t |

With the critical sections written this way, only one of the fields can be set to false, and the program will behave as it would have under the original synchronization logic written by the programmer. Similarly, it would be tempting to remove the read-only paths from the replicated critical section, but this transformation would also be incorrect. If the read-only paths did not execute when the multiple reader lock was held, it does not mean that the read-only path will execute when the writer lock is subsequently acquired. In the example, the threads can both seem to enter paths where a write will occur. However, only one of those threads subsequently writes a value. If the reader path is removed from the path that acquires a full lock on the assumption that the write will occur, then the value of the local variable "t" may not have the correct value if the write does not actually occur.

The writer lock only version may not execute if the critical section does not execute a path that requires the write-only version. The modified critical segment therefore, is altered so that if execution does not go to the replicated segment, execution flows to the instruction in the program that would execute after the original critical segment, bypassing the writer lock version of the code.

Illustrative embodiments enable identification of a critical segment within the computer usable program code segment, replicating the critical segment to create a replicated segment, and establishing a reader lock only version of the critical segment and a writer lock only version of the replicated segment. The critical segment has been modified to allow continued processing in the reader lock only version, bypassing the writer lock only version until the writer lock only version is needed. In this manner, normal execution flow continues with the efficiency of multiple reader locks while allowing for the use of the writer lock only version, as needed.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable type medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a transmission medium that is, for example, without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for optimization of computer usable program code segment containing multiple reader locks having a non-reader lock therein, the computer implemented method comprising:
    obtaining computer usable program code that is to be compiled;
    responsive to obtaining the computer usable code that is to be compiled, identifying, by a compiler, a critical segment within the computer usable program code;
    replicating the critical segment to create a replicated segment; and
    transforming the critical segment by establishing a reader lock only version of the critical segment and a writer lock only version of the replicated segment together as a transformed code segment so that a reader lock is used when control flow paths execute without any writes occurring, and when a control flow path executes that will cause a write to occur, then the writer lock only version will be acquired and all of the critical segment will be re-executed under the writer lock only version and any values read while the critical segment was protected under the reader lock only version are deleted.

2. The computer implemented method of claim 1 wherein identifying the critical segment further comprises scanning the computer usable program code segment to locate computer usable program code having a set of reader lock only execution paths that only reads variables and a set of second execution paths wherein a second execution path is one of a write to a variable, a function call that is unsafe, and a path that cannot be analyzed.

3. The computer implemented method of claim 1 wherein replicating the critical segment further comprises:
    placing the replicated segment adjacent to and inline with the critical segment; and
    arranging the reader lock only version to execute prior to execution of the writer lock only version, otherwise bypassing the writer lock only version.

4. The computer implemented method of claim 1 wherein establishing a writer lock only version further comprises modifying the replicated segment to release a reader lock as a first operation.

5. A data processing system for optimization of computer usable program code segment containing multiple reader locks having a non-reader lock therein, the data processing system comprising:
    a bus;
    a storage device connected to the bus, wherein the storage device contains computer usable code;
    a communications unit connected to the bus; and
    a processing unit connected to the bus wherein the processing unit executes the computer usable program code to direct the data processing system to:
    obtain computer usable program code that is to be compiled;
    responsive to obtaining the computer usable code that is to be compiled, identify by a compiler, the segment as a critical segment within the computer usable program code;
    replicate the critical segment to create a replicated segment; and
    transform the critical segment by establishing a reader lock only version of the critical segment and a writer lock only version of the replicated segment together as a transformed code segment so that a reader lock is used when control flow paths execute without any writes occurring, and when a control flow path executes that will cause a write to occur, then the writer lock only version will be acquired and all of the critical segment will be re-executed under the writer lock only version and any values read while the critical segment was protected under the reader lock only version are deleted.

6. The data processing system of claim 5 wherein directing the data processing system to identify the critical segment further comprises scanning the computer usable program code segment to locate computer usable program code having a set of reader lock only execution paths that only reads variables and a set of second execution paths wherein a second execution path is one of a write to a variable, a function call that is unsafe, and a path that cannot be analyzed.

7. The data processing system of claim 5 wherein directing the data processing system to replicate the critical segment further comprises:
    placing the replicated segment adjacent to and inline with the critical segment; and
    arranging the reader lock only version to execute prior to execution of the writer lock only version, otherwise bypassing the writer lock only version.

8. The data processing system of claim 5 wherein directing the data processing system to establish a writer lock only version further comprises modifying the replicated segment to release a reader lock as a first operation.

9. A computer program product for optimization of computer usable program code segment containing multiple reader locks having a non-reader lock therein, the computer program product comprising computer usable program code tangibly embodied on a computer usable recordable type medium, the computer usable program code comprising:

computer usable program code for obtaining computer usable program code that is to be compiled;

computer usable program code for responsive to obtaining the computer usable code that is to be compiled, identifying, by the compiler, the segment as a critical segment within the computer usable program code segment;

computer usable program code for replicating the critical segment to create a replicated segment; and computer usable program code for establishing a reader lock only version of the critical segment and a writer lock only version of the replicated segment together as a transformed code segment so that a reader lock is used when control flow paths execute without any writes occurring, and when a control flow path executes that will cause a write to occur, then the writer lock only version will be acquired and all of the critical segment will be re-executed under the writer lock only version and any values read while the critical segment was protected under the reader lock only version are deleted.

10. The computer program product of claim 9 wherein the computer usable program code for identifying the critical segment further comprises computer usable program code for scanning the computer usable program code segment to locate computer usable program code having a set of reader lock only execution paths that only reads variables and a set of second execution paths wherein a second execution path is one of a write to a variable, a function call that is unsafe, and a path that cannot be analyzed.

11. The computer program product of claim 9 wherein computer usable program code for replicating the critical segment further comprises:

computer usable program code for placing the replicated segment adjacent to and inline with the critical segment; and computer usable program code for arranging the reader lock only version to execute prior to execution of the writer lock only version, otherwise bypassing the writer lock only version.

12. The computer program product of claim 9 wherein computer usable program code for establishing a writer lock only version further comprises computer usable program code for modifying the replicated segment to release a reader lock as a first operation.

* * * * *